United States Patent
Kesavan et al.

(10) Patent No.: US 9,363,266 B2
(45) Date of Patent: Jun. 7, 2016

(54) SECURED ELECTRONIC DEVICE

(75) Inventors: Vijay Sarathi Kesavan, Hillsboro, OR (US); Victor B. Lortz, Beaverton, OR (US); Anand P. Rangarajan, Hillsboro, OR (US); Xingang Guo, Portland, OR (US); Somya Rathi, Sunnyvale, CA (US); Ranjit Narjala, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,567

(22) PCT Filed: Dec. 29, 2011

(86) PCT No.: PCT/US2011/067852
§ 371 (c)(1),
(2), (4) Date: Mar. 19, 2014

(87) PCT Pub. No.: WO2013/101070
PCT Pub. Date: Jul. 4, 2013

(65) Prior Publication Data
US 2014/0196111 A1    Jul. 10, 2014

(51) Int. Cl.
| | | |
|---|---|---|
| H04L 29/06 | (2006.01) | |
| B60R 16/02 | (2006.01) | |
| H04W 4/04 | (2009.01) | |
| H04L 29/08 | (2006.01) | |
| H04L 9/32 | (2006.01) | |

(52) U.S. Cl.
CPC ............ *H04L 63/0869* (2013.01); *B60R 16/02* (2013.01); *H04L 9/3265* (2013.01); *H04L 63/0823* (2013.01); *H04L 67/12* (2013.01); *H04W 4/046* (2013.01); *H04L 2209/80* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 2004/0001593 A1* | 1/2004 | Reinold | B60R 25/04 380/277 |
| 2005/0270146 A1 | 12/2005 | Enya et al. | |
| 2006/0253703 A1* | 11/2006 | Eronen et al. | 713/156 |
| 2007/0075848 A1 | 4/2007 | Pitt | |
| 2007/0200671 A1* | 8/2007 | Kelley et al. | 340/5.72 |
| 2009/0249074 A1* | 10/2009 | Madhavan | H04L 9/3263 713/176 |
| 2010/0173673 A1* | 7/2010 | Lydon | 455/557 |
| 2010/0191973 A1 | 7/2010 | Huntzicker et al. | |
| 2010/0201483 A1 | 8/2010 | Nakajima et al. | |

(Continued)

FOREIGN PATENT DOCUMENTS

| | | |
|---|---|---|
| CN | 101405177 A | 4/2009 |
| CN | 101798888 A | 8/2010 |

(Continued)

OTHER PUBLICATIONS

Dierks et al. RFC 2246—TLS Protocol Jan. 1999 pp. 29-46.*

(Continued)

*Primary Examiner* — David Pearson
(74) *Attorney, Agent, or Firm* — Sutherland Asbill & Brennan LLP (57) ABSTRACT

Methods, systems, and apparatus for communicatively pairing and securing an electronic device to a vehicle based electronic system. The pairing can enable the electronic device to seamlessly communicate with the electronic device and can provide infotainment to users of the vehicle.

27 Claims, 4 Drawing Sheets

(56) References Cited

U.S. PATENT DOCUMENTS

| | | | |
|---|---|---|---|
| 2010/0205429 A1* | 8/2010 | Alrabady et al. | 713/156 |
| 2010/0241857 A1* | 9/2010 | Okude et al. | 713/168 |
| 2010/0304716 A1 | 12/2010 | Hoeksel et al. | |
| 2012/0030470 A1* | 2/2012 | Jdanov | H04L 63/0823 713/176 |
| 2012/0324482 A1* | 12/2012 | Park | 719/328 |

FOREIGN PATENT DOCUMENTS

| | | |
|---|---|---|
| JP | 2003-258794 | 9/2003 |
| JP | 3622686 B2 | 2/2005 |
| JP | 2006-262184 | 9/2006 |
| JP | 2009-135688 | 6/2009 |
| WO | 2013/101070 A1 | 7/2013 |

OTHER PUBLICATIONS

International Preliminary Report on Patentability and Written Opinion received for PCT Patent Application No. PCT/US2011/067852, mailed on Jul. 10, 2014, 7 pages.

International Search Report and Written Opinion received for PCT Application No. PCT/US2011/067852, mailed on Sep. 12, 2012, 10 pages.

Extended European Search Report for European Patent Application 11878799.3-1870 mailed Jul. 27, 2015. 7 Pages.

Office Action for Japanese Patent Application 2014-54780 mailed Aug. 25, 2015. 5 pages Japanese Office Action, 6 pages English Translation.

Chinese Office Action dated Sep. 28, 2015 (13 pages); Office Action Translation (8 pages).

* cited by examiner

SECURED ELECTRONIC DEVICE

TECHNICAL FIELD

This invention generally relates to electronic devices, and more particularly to securing an electronic device.

BACKGROUND

In-vehicle infotainment (IVI) systems are often provided on vehicles, such as cars, to provide the users and occupants of the vehicle with entertainment and information. For example, the entertainment may include watching videos, listening to music, playing video games, playing interactive games, or the like. The information may include navigation, traffic, road information, weather, or the like.

The IVI system may include one or more computers or processors coupled to a variety of user interfaces. The IVI system may be part of the vehicle's main computer or a stand-alone system that may optionally be coupled to the vehicle's main computer. The user interfaces may be any one of speakers, displays, keyboards, dials, sliders, or any suitable input and output element. The system, therefore, may use any variety of user interfaces to interact with a user of the system, such as a driver of the vehicle. Furthermore, the IVI system may use any variety of user interfaces to provide media or information to the user. For example, the IVI system may receive navigation information, such as global positioning satellite (GPS) information from a GPS system, and display the same on a center console of the vehicle. Such information, may be used by the driver of the vehicle for navigation purposes. As another example, the IVI system may receive media signals from a digital video disc (DVD) player and provide the same to a display for viewing the media content. In this case, the DVD player may be at the front of a vehicle where a parent can load the media and the media content may be viewed by a child seated at the rear of the vehicle.

In conventional IVI systems and associated user output elements, the user output elements are typically coupled to the vehicle. In other words, a display may be physically coupled to the vehicle and may not be used outside of the vehicle. Alternatively, the user may carry an electronic device capable of providing information or media thereon into the vehicle and use it within the vehicle. For example, a user may carry a tablet computer into a vehicle and use the same for reading a book thereon. This electronic device, however, is not coupled to the IVI system and is not secured to the IVI system. Therefore, the electronic device may not have access to substantially all aspects of the vehicle's IVI system or main computer. Furthermore, the electronic device, if left within the vehicle, may be a target of theft as the electronic device could be used for a variety of applications including applications involving viewing media and information on other vehicles.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Embodiments of the disclosure are described more fully hereinafter with reference to the accompanying drawings, in which embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure provide systems, methods, and apparatus for pairing an electronic device to a vehicle. The electronic device may be any suitable device that may provide output that can be sensed by a user or can receive input from the user. The vehicle may have an in vehicle infotainment (IVI) system that can be paired with the electronic device. In one aspect, after pairing, the electronic device may serve as an extension of the IVI system. The IVI system may be part of the vehicle's main computer or a stand-alone system. The IVI system may further provide media or information to the electronic device after pairing that can be rendered by the electronic device and sensed by the user. The embodiments may further lock or secure the electronic device to the IVI system. The electronic device secured to the IVI system may be able to access information associated with the IVI system and optionally a vehicle. The electronic device may further be able to communicate and receive information or media from other sources. For example, the electronic device may be portable and may be taken out of the vehicle and used for purposes other than interfacing with the system of the vehicle. In certain embodiments, the electronic device may only be paired with a single IVI system associated with a respective vehicle. Therefore, in such embodiments, the electronic device may not be paired and secured to another IVI system without intervention by an entity authorized to secure the electronic device to a new system associated with a different vehicle. The process of securing the electronic device to the vehicle may entail the exchange of authentication information, such as electronic keys. The exchange of authentication information may further entail involvement of one or more parties other than the IVI system and the electronic device. In certain aspects, due to the securing of the electronic device to a particular IVI system, the paired electronic device may not be an attractive target for theft from the vehicle.

Example embodiments of the invention will now be described with reference to the accompanying figures.

Figure 1:
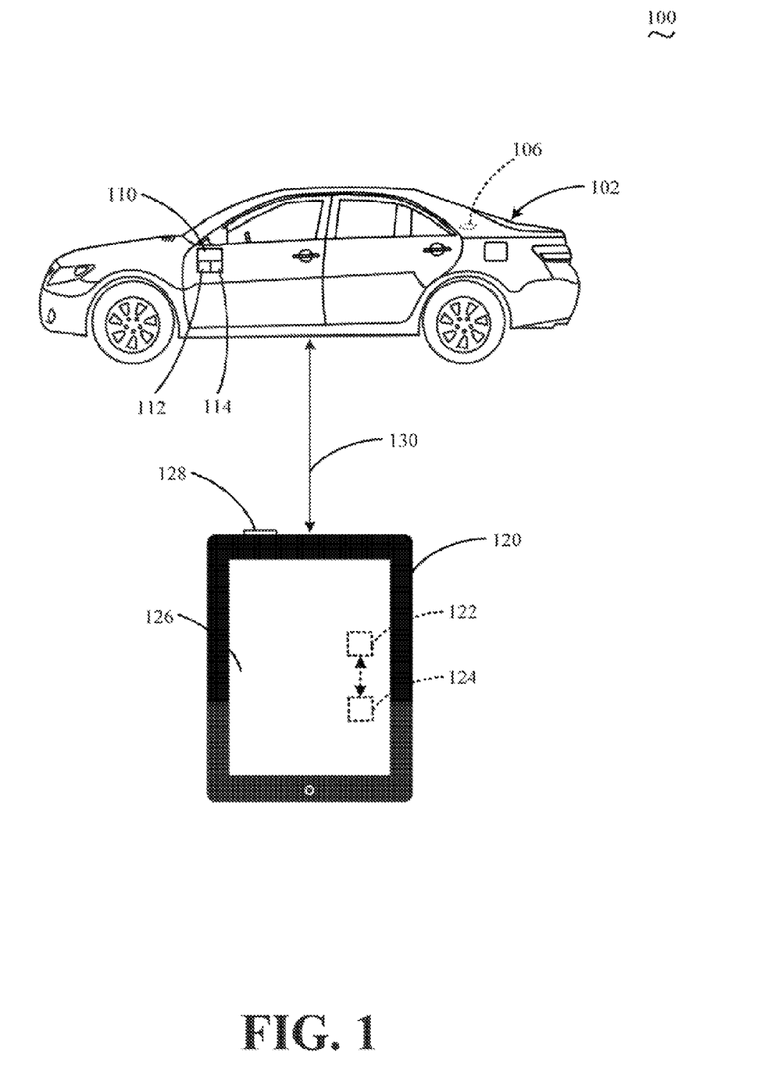
FIG. 1 is a simplified schematic diagram illustrating an example pairing of an electronic device with an in-vehicle infotainment (IVI) system of a vehicle in accordance with embodiments of the disclosure.

Referring now to FIG. 1, an example system 100 including an example vehicle 102 that may include an IVI system 110 and one or more sensory elements 106, depicted here as speakers provided in the vehicle 102. The IVI system may further include one or more processors 112 communicatively coupled to an electronic memory 114. The IVI system 110 may also be configured to be coupled to an electronic device 120. The electronic device 120 may include one or more electronic device processors 122 communicatively coupled to an electronic device memory 124, as well as, user interface 126, depicted in the form of a touch screen, and an output element 128, depicted in the form of a speaker. The one or more electronic device processors 122 may communicate with the one or more processors 112 via a communicative link 130 therebetween.

For the purposes of this discussion, the vehicle 102 may include, but is not limited to, a car, a truck, a light-duty truck, a heavy-duty truck, a pickup truck, a minivan, a crossover vehicle, a van, a commercial vehicle, a private vehicle, a sports utility vehicle, a tractor-trailer, an aircraft, an airplane, a jet, a helicopter, a space vehicle, a watercraft, or any other suitable vehicle with information and media capability. However, it will be appreciated that embodiments of the disclosure may also be utilized in other transportation or non-transportation related application where electronically securing one device to another device may be implemented.

While the one or more sensory elements 106 are depicted as speakers within the vehicle 102, the one or more sensory elements may be any suitable user output element. As a result, one or more sensory elements 106 may provide audio, visual, tactile, or olfactory output that may be sensed by one or more users or passengers in the vehicle 102. For example, the one or more sensory elements 106 may include a display screen for providing images or video to the user. Such a display may be mounted, for example, on the back of a passenger-side seat (not shown) of the vehicle 102 and may be used for entertaining a child. As another example, the one or more sensory elements 106 may include a video game controller with haptic feedback, such as a Rumble Pak®. Regardless of the form of the one or more sensory elements 106, the one or more sensory elements 106 may be communicatively coupled to the one or more processors 112 of the IVI system 110. The one or more sensory elements 106, may receive signals from the IVI system 110 for providing sensory output to occupants of the vehicle 102. Additionally, the one or more sensory elements 106, may transmit signals to the IVI system 110 for providing input from occupants of the vehicle 102.

The one or more processors 112 may include, without limitation, a central processing unit (CPU), a digital signal processor (DSP), a reduced instruction set computer (RISC), a complex instruction set computer (CNC), a microprocessor, a microcontroller, a field programmable gate array (FPGA), or any combination thereof. The IVI system 110 may also include a chipset (not shown) for controlling communications between the one or more processors 112 and one or more of the other components of the IVI system 110. In certain embodiments, the system 110 may be based on an Intel® Architecture system and the one or more processors 112 and chipset may be from a family of Intel® processors and chipsets, such as the Intel® Atom® processor family. The one or more processors 112 may also include one or more application specific integrated circuits (ASICs) or application specific standard products (ASSPs) for handling specific data processing functions or tasks.

The memory 111 may include one or more volatile and/or non-volatile memory devices including, but not limited to, magnetic storage devices, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM) universal serial bus (USB) removable memory, or combinations thereof.

In certain embodiments, the IVI system 110 may be a part of (or in communication with) a general vehicle main computer system. The main computer may, in one aspect, manage various functions of the operation of the vehicle, such as engine control, transmission control, and various component controls. Therefore, in such embodiments, the IVI system 110 may share resources with other subsystems of the main vehicle computer. Such resources may include the one or more processors 112 or the memory 114. In other embodiments, the IVI system 110 may be a separate and stand-alone system that controls information and entertainment delivery to occupants of the vehicle. Information, as provided by the IVI system 110, may include, but is not limited to, weather forecasts, navigation information, road condition information, traffic information, crime information, points of interest information, or combinations thereof. Entertainment, as provided by the IVI system 110, may include, but is not limited to, video displays, audio output, music, movies, digital photographs, video games, interactive games, or combinations thereof.

While depicted as a tablet computer, the electronic device 120 may be any suitable device. For the purposes of this discussion, the electronic device 120 may include, but is not limited to, a tablet computer, a notebook computer, an netbook computer, a personal digital assistant (PDA), a cellular telephone, a smart phone, a digital reader, or any other suitable electronic device with communicative capability. In one aspect, the electronic device may be a portable or mobile electronic device.

The one or more electronic device processors 122 may be any suitable type of processor. In certain embodiments the one or more electronic device processors 122 may be of similar type as the one or more processors 112 of the IVI system 110. Therefore, the various types or configurations of the one or more electronic device processors 122 may encompass at least the type and configuration options as discussed with reference to the one or more processors 112 above. Similarly, the electronic device memory 124 may encompass at least the type and configuration options as discussed for the memory 114 above and will not be repeated here in the interest of brevity.

The user interface 126, while depicted as a touch screen on a tablet computing device, may be any suitable user interface 126. The user interface 126 may in one aspect receive input from the user, provide output to the user, or both. Therefore the user interface 126 may be depicted as a display, a touch pad, an audio output device, such as a speaker, a speech recognition engine providing speech to text functionality, accelerometer based inputs, an image sensor, or the like.

The output element 128 of the electronic device 120 may be optional. Although the output element 128 is depicted as a speaker provided on the electronic device 120, the output element 128 may be any suitable element that can provide output from the electronic device 120 that can be sensed by a user of the electronic device 120. Therefore output elements may entail any combination of speakers, displays, vibrators, or the like.

The communicative link 130 may be any suitable link between the electronic device 120 and the IVI system 110 of the vehicle 102. In one aspect the communicative link 130 may be a secured link. The information provided over the communicative link 130 between the particular electronic device 120 and the IVI system 110 of the particular vehicle 102 may be more comprehensive than information that may be shared by the IVI system 110 with other electronic devices that are not secured to the IVI system 110. For example, the IVI system 110 and the electronic device 120 may be able to share information regarding vehicle identification, vehicle diagnostics, and vehicle performance data. Such information may generally be protected and not shared with all electronic devices or without authentication.

In one aspect, the establishment of the communicative link 130 may entail the electronic device 120 to not be able to establish a similar link with a different IVI system without the involvement of an authorized entity, such as a vehicle dealer. Therefore, in certain embodiments once the electronic device 120 has been securely paired with a particular IVI system 110, it can no longer be paired with a different IVI system 110 without engaging in a secure re-pairing procedure. Since the electronic device 120 is securely paired via the communicative link 130, the electronic device 120 may be relatively less attractive from a theft standpoint. In other words, if the electronic device 120 was stolen from the vehicle 102, it may be relatively difficult to pair the stolen electronic device 120 to a different vehicle without the detection of theft. The authorized entity that may perform a re-pairing process to re-pair an electronic device to a new vehicle may, in certain circumstances, require proof that the electronic device is not stolen. In other words, there may be verification of the ownership of electronic devices by the authorized entity, such as a vehicle dealership, before pairing or re-pairing processes are commenced.

In another aspect, data shared over the communicative link 130 may be protected from misuse by other software or applications running on the electronic device 120. In other words, there may be firewalls established between certain applications running on the electronic device and other applications related to communications between the electronic device 120 and the IVI system 110. Therefore, third-party software and applications may be installed on the electronic device 120, but the third-party software and applications may not be able to access the IVI system 110 and the associated vehicle communications infrastructure, such as a car data bus or a controller area network (CAN), without authorization. This feature may provide an extra layer of security to protect the vehicle IVI system 110 or main computer from unauthorized access or hacking that may damage the IVI system, the main computer of the vehicle 102, or one or more components of the vehicle 102. As a result, access may be granted to relatively substantial portions of the vehicle's 102 information and control systems to an authorized user, such as the owner of the vehicle 102 and electronic device 120, without substantially compromising the security of the vehicle's 102 information systems.

The above described security implemented between applications running on the electronic device 120 for purposes unrelated to communicating with the IVI system 110 and applications communicating with the IVI system 110 may prevent trojan horses, viruses, worms, or other malware that may have infected the electronic device 110 from further infecting the IVI system 110 or other electronic systems on the vehicle 102. In other words, only authorized applications running on the one or more electronic device processors 122 may be able to communicate with the one or more processors 112 of the IVI system. In certain embodiments, authorization may entail having a single gateway application running on the electronic device 120 that manages all communications with the IVI system 110. The single gateway application may serve as a checkpoint and determine if an application is authorized before relaying communications from that application on to the IVI system 110. In other embodiments, the IVI system 110 may have applications running thereon that may verify the authorization of other applications running on the electronic device 120 before accepting communication messages from the same.

The communicative link 130 may be any suitable electronic communication link including, but not limited to, a hardwired connection, a serial link, a parallel link, a wireless link, a Bluetooth® channel, a ZigBee® connection, a wireless fidelity (Wi-Fi) connection, a proprietary protocol connection, or combinations thereof. In one aspect, the communicative link 130 may be secure such that it is relatively difficult to intercept and decipher communications between the electronic device 120 and the IVI system 110. In certain embodiments, the communicative link may be encrypted. Further, in certain embodiments, the communications may be encrypted at more than one open systems interconnections (OSI) model layer. For example, the communications between the electronic device 120 and the vehicle 102 may be encrypted at both the application layer and the transport layer.

In operation, the vehicle system 100 may establish the secure communicative 130 between the electronic device 120 and the IVI system 110 and transfer information thereon. The IVI system 110 may provide media or information via the communicative link 130 to the electronic device 120. The system 110 may also receive user input from the electronic device 120 via the communicative link 130. As a non-limiting example, consider that the IVI system 110 provides streaming video and audio signals to the electronic device 120 to entertain a child in the backseat of the vehicle 102. The choice of the streaming video and audio signals may be made via input from the electronic device 120, such as via the user interface 126. In one aspect the choice as selected using the user interface 126 may be communicated to the IVI system 110 and the constituent one or more processors 112 via the communicative link 130. Responsive to the choice, the one or more processors 112 may provide a corresponding streaming media. The streaming media may be received by the electronic device 120 and displayed on the user interface 126. Audio associated with the streaming media may be played via the output element 128. Therefore, it can be appreciated that the electronic device 120 may serve as an input and output conduit for the IVI system 110. In certain aspects, the electronic device 120 may provide a secured user interface for the IVI system 110 that can be taken out of the vehicle 102 and used separately from the IVI system 110.

It will be appreciated that the electronic device 120 may serve as one of many user interfaces for the IVI system 110. This concept may be better understood with continuing reference to the example above. When streaming media is provided from the IVI system 110 to the electronic device 120, the video portion of the media may be displayed on the user interface 126 of the electronic device 120 and the audio of the media may be provided and rendered by the one or more sensory elements 106. Therefore, it can be seen that the IVI system 110 can provide multiple signals associated with a single function, in this case providing a streaming media to an occupant of the vehicle 102, via multiple user interfaces and channels. One of the interfaces of the IVI system 110 may be the electronic device 120.

Another nonlimiting example of the usage of electronic device 120 in conjunction with the IVI system 110 may be a display of GPS navigation data on the user interface 126. The IVI system 110 may receive GPS navigation data from a GPS system and the one or more processors 112 may communicate the GPS navigation data to the one or more electronic device processors 122, and the one or more electronic device processors 122 may display the associated information on the user interface 126.

As yet another nonlimiting example, the IVI system 110 may retrieve vehicle diagnostic and performance information from the vehicle main computer and display the same via the electronic device 120. The vehicle 102, via, the IVI system 110 and the electronic device 120, may warn the user that one or more components of the vehicle 102 may require servicing or maintenance. Alternatively, the driver may be provided an electronic vehicle 102 maintenance record, suggested maintenance dates of various components, suggested date for an oil change, suggested date for a transmission fluid change, suggested date for a brake fluid change, suggested date for a coolant flush, suggested date for replacing timing belts, fuel mileage performance, or the like, via the IVI system 110 and the electronic device 120.

It may be appreciated that the electronic device 120 may be utilized by the system 110 to provide information or entertainment to occupants within the vehicle 102, and the electronic device 120 may further be utilized for functions unrelated to the IVI system 110. Further, the electronic device 120 may be removed from the vehicle 102. As an example, a particular electronic device 120 may be used by a user for her own personal computing or entertainment needs outside of the vehicle 102. The same electronic device 120, when brought into the vehicle 102, may serve the purpose of providing an interface with the IVI system 110 of the vehicle 102, wherein the IVI system 110 and the electronic device 120 have been securely paired. In such a situation, the electronic device 120 may have all the functions of a similar electronic device that has not been paired to the IVI system. At the same time, the securely paired electronic device 120 may provide an interface for the IVI system 110 without diminishing the security and stability of the IVI system 110. In certain aspects, the securely paired electronic device 120 may have access to more information related to the vehicle 102 than an electronic device that is not securely paired to the IVI system 110.

It should be noted that, while a single electronic device is depicted, any number of electronic devices may be paired to a single vehicle. For example, a vehicle with four occupants may have four separate electronic devices paired therewith. Each individual occupant of the vehicle may interact with the IVI system of the vehicle independently via a separate electronic device.

Furthermore, it should be noted that a single electronic device may be securely paired with more than one vehicle. Each pairing may be performed by an authorized third party. In some cases, the pairing authority may be the same for each vehicle securely paired to the electronic device. In other cases, the pairing authority may be different for one or more of the vehicles with which the electronic device is securely paired than the other of the vehicles. For example, suppose an individual owns two vehicles and would like to pair her electronic device to both of her vehicles. The individual may securely pair her electronic device to the first vehicle with the assistance of a first authorized third party and then may securely pair her electronic device to the second vehicle with the assistance of a second authorized third party.

Figure 2:
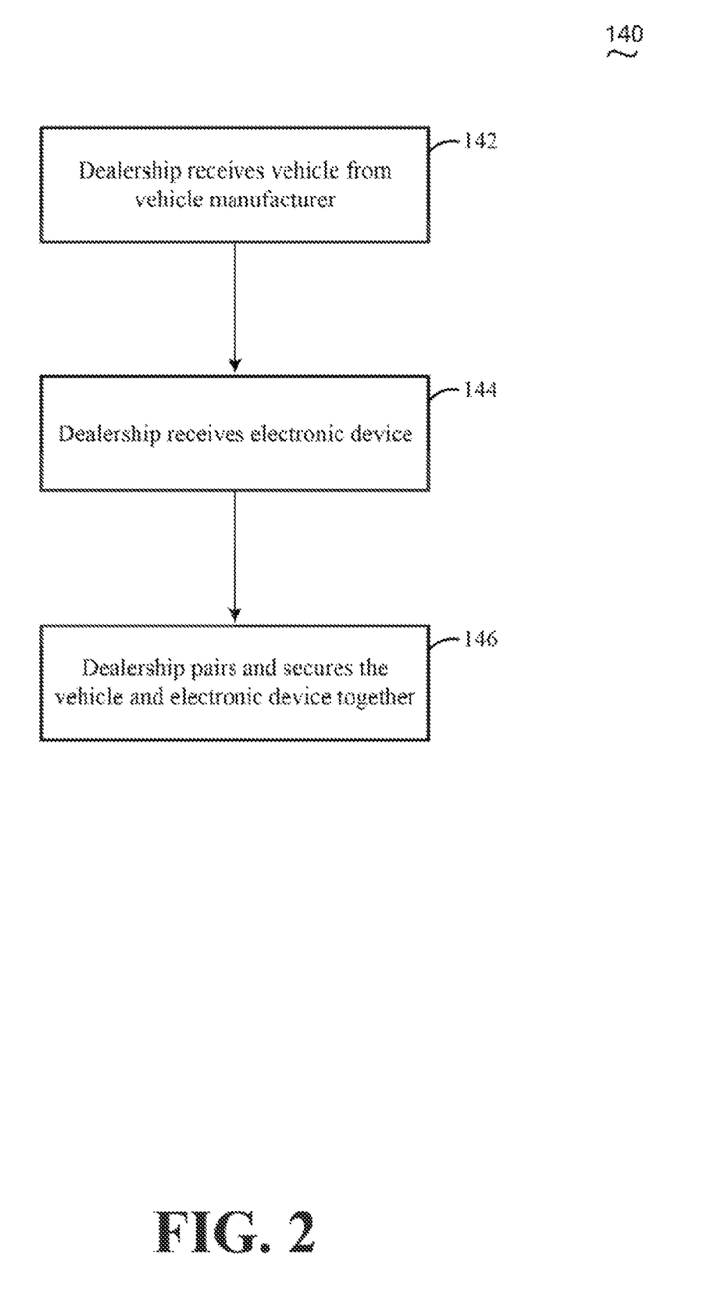
FIG. 2 is a simplified flow diagram illustrating an example method for pairing and locking the electronic device and the vehicle of FIG. 1 in accordance with embodiments of the disclosure.

Referring now to FIG. 2, an example method 140 for locking or securing the vehicle and the electronic device together is illustrated. The securing or pairing process may involve a third-party other than the owner or user of either the vehicle or the electronic device. In this method 140, a vehicle dealership may be the third-party that performs the pairing of the electronic device to the vehicle. At block 142, the dealership may receive the vehicle from the vehicle manufacturer. In this case, the vehicle manufacturer manufactures the vehicle 102 with its constituent parts including the IVI system 110. In other cases, the IVI system 110 may be provided on the vehicle by a party other than the manufacturer, such as the dealership. In yet other cases, the IVI system 110 may be provided on the vehicle 102 by a party other than the manufacturer of the vehicle or the dealership, such as an aftermarket installer. For the purposes of this discussion, the dealership may entail any entity that obtains the vehicle 102 from the vehicle manufacturer or any other party and resells the vehicle 102 to an end user.

At block 144, the dealership may receive the electronic device. The electronic device 120 may be obtained by the dealership from the end-user. Accordingly, the end-user may have a choice in the type and feel of the electronic device 120 that she wishes the pair securely to the vehicle 102. The vehicle 102 may be paired to a variety of electronic devices, including, for example, Apple® iPad®, Samsung® Galaxy Tab®, or Dell® Latitude® Tablets. The electronic device provided by the user may run on a variety of operating systems including, but not limited to, Intel's® TiZen, Microsoft's® Windows®, Google's® Android®, Apple's® iOS®, or combinations thereof. Alternatively, the electronic device may be obtained by the dealership directly from a manufacturer or a third-party distributor of the electronic device without the involvement of the user of the vehicle. In one aspect, the dealership may obtain the electronic device directly from the manufacturer of the electronic device or third-party distributor of the electronic device based upon a preference or choice indicated by the user of the vehicle or the electronic device.

At block 146, the dealership may pair and lock or secure the vehicle 102 and the electronic device 120 together. In certain embodiments, the dealership or any dealership associated with a particular manufacturer of the vehicle 102 may be the only entities that can be authorized to securely pair the vehicle 102 and the electronic device 120 together. In other embodiments, there may be other third-party entities in addition to the dealership that may be authorized to securely pair the vehicle 102 and the electronic device 120 together. The dealership may exchange a variety of authentication information with one or more of the vehicle 102 and the electronic device 120 to enable the secure pairing therebetween. More details of the exchange of authentication information are disclosed with reference to FIGS. 3 and 4.

Figure 3:
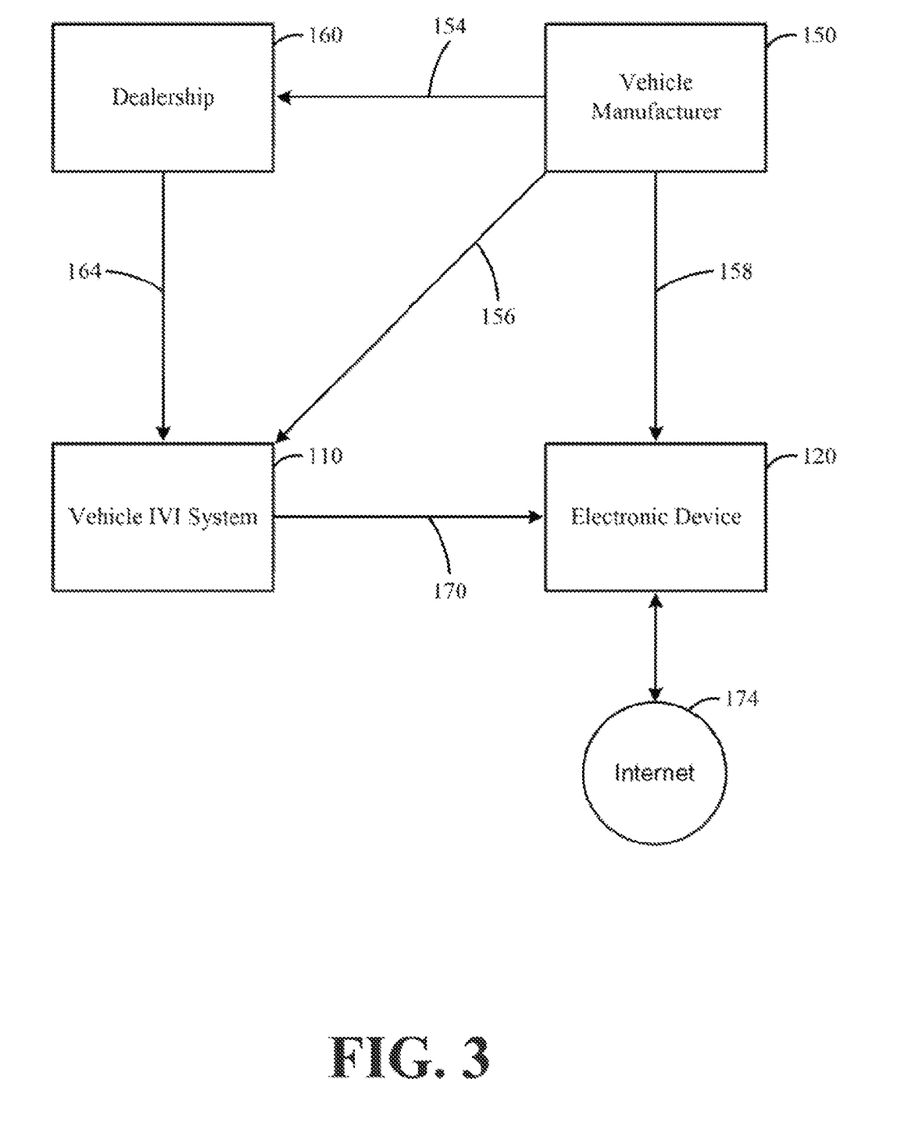
FIG. 3 is a simplified block diagram illustrating interactions between various parties in pairing and securing the electronic device to the vehicle of FIG. 1 in accordance with embodiments of the disclosure.

Referring now to FIG. 3, an example exchange of electronic certificates and authentication information for the purposes of securing the electronic device 120 to the IVI system 110 is illustrated. A vehicle manufacturer 150 may have a communicative link 154 to a dealership 160, a communicative link 156 to a vehicle IVI system 110, and a further communicative link 158 to the electronic device 120. The dealership 160 may have a communicative link 164 to the IVI system 110, and the IVI system 110 may have a communicative link 170 to the electronic device 120. The electronic device 120 may be further coupled to the Internet 174.

The vehicle manufacturer 150 may be configured to transmit, via communicative link 154, an electronic certificate, such as a dealer certificate, to the dealership 160. In one aspect, the dealership 160 may request the dealer certificate from the vehicle manufacturer 150. Alternatively, the vehicle manufacturer may provide a dealer certificate to all or a subset of dealerships associated with the vehicle manufacturer. The transmitting of the dealer certificate may be accomplished by one or more computers associated with the vehicle manufacturer 150 communicating with one or more computers associated with the dealership 160. In one aspect, the communicative link 154 may be secure. For example the communicative link 154 or the dealer certificate may be encrypted so that it is relatively difficult for the dealer certificate to be intercepted by a third party during transmission from the vehicle manufacturer 150 to the dealership 160. The transmission of the dealer certificate may also be transmitted in parts in the form of data packets communicated over the communicative link 154. Data packets associated with the transmission of the electronic certificates may include cyclic redundancy checks (CRC), parity checks, or other suitable forms of transmission error checks.

The vehicle manufacturer 150 may further provide an electronic certificate, such as an IVI system certificate, to the vehicle's 102 IVI system 110 via the communicative link 156. In one aspect, the IVI system certificate may be transmitted via the communicative link 156 before the vehicle 102 has been delivered to the dealership 160. Further, the IVI system certificate may be provided on the memory 114 of the IVI system 110 by the manufacturer 150 prior to delivery of the vehicle to the dealership 160. Therefore the communicative link 156 may be a connection between the one or more computers associated with the manufacture 150 and the one or more processors 112 of the IVI system 110.

Additionally, the vehicle manufacturer 150 may provide an additional electronic certificate, such as an original equipment manufacturer (OEM) root certificate for dealers, to the vehicle's 102 IVI system 110 via the communicative link 156. Further still, the vehicle manufacturer 150 may provide yet a third electronic certificate, such as an OEM root certificate for electronic devices, to the vehicle's 102 IVI system 110 via the communicative link 156. Similar, to the case for the IVI system certificate, the OEM root certificate for dealers and the OEM root certificate for electronic devices may be provided on the memory 114 of the vehicle 102 prior to the vehicle delivery to the dealership 160. Therefore the electronic certificates stored in memory 114 may be accessible by the one or more processors 112.

It should be noted that some or all of the certificates provided from the vehicle manufacturer 150 to the IVI system 110 may be provided at the same time, such as during or after manufacture of the vehicle 102 and prior to delivery of the vehicle to the dealership 160. In other cases, the certificates provided from the vehicle manufacturer 150 to the IVI system 110 may be provided at different times. For example, the IVI system certificate may be provisioned prior to delivery of the vehicle 102 to the dealership and the OEM root certificate for dealers and OEM electronic device certificate may be provisioned to the vehicle 102 after delivery to the dealership 160 or after the vehicle is sold to the end user. In the later embodiments, the communicative link 156 may represent more than one type of link. For example, the communicative link for transferring electronic certificates onto the IVI system 110 prior to dealer deliver of the vehicle 102 may use direct wired or Wi-Fi enabled transfer of the electronic certificates. On the other hand, electronic certificates that may be transferred to the IVI system 110 after the vehicle has left the vehicle manufacturer 150 may be, for example, via the Internet or by non-network mechanisms, such as a universal serial bus (USB) drive or compact disk read only memories (CD-ROMS). Continuing on with FIG. 3, the vehicle manufacturer 150 may further provide the electronic device 120 with an electronic certificate, such as the OEM electronic device root certificate. In certain embodiments, therefore, the OEM electronic device root certificate may be provided to both the IVI system 110 of the vehicle and the electronic device 120. The vehicle manufacturer 150 may also provide the electronic device 120 with a second electronic certificate, such as an electronic device certificate. In one aspect, the OEM electronic device root certificate and the electronic device certificate, once received by the electronic device 120, may be stored on the electronic device memory 124 and may be accessible by the one or more electronic device processors 122.

Similar to the case of provisioning the IVI system 110 with electronic certificates, when provisioning the electronic device 120 with certificates, the process may be conducted in certain embodiments at the vehicle manufacturer 150. For example, the vehicle manufacturer 150 may physically have the electronic device 120 at its premises and transmit the OEM electronic device root certificate and the electronic device certificate on to the electronic device 120 by communicating with the one or more electronic device processors 122 via communicative link 158. The communicative link may, therefore, include a hardwire connection, such as with serial or parallel connection ports. Alternatively, the communicative link 158 may be a wireless link, such as Bluetooth®, Wi-Fi, or the like.

In certain other embodiments, the electronic device 110 may be provisioned with one or more of the OEM electronic device root certificate and the electronic device certificate at a location other than the vehicle manufacturer 150 premises. As a non-limiting example, the OEM electronic device root certificate may be provided to the electronic device 120 from a manufacturer of the electronic device and the electronic device certificate may be provided to the electronic device 120 from the vehicle manufacturer 150. In this scenario, the electronic device 120 may have more than one communicative link for receiving the electronic certificates.

In summary, the vehicle manufacturer 150 or another party may provision the dealership 160 with the dealer certificate and the IVI system 110 with the OEM root certificate for dealers, the IVI system certificate, and the OEM electronic device root certificate, and the electronic device 120 with the OEM electronic device root certificate and the electronic device certificate. In certain embodiments, each of the electronic certificates may be transmitted by the vehicle manufacturer 150 from the one or more computers associated with the vehicle manufacturer 150. Prior to transmission, the electronic certificates may be stored in a database implemented on an electronic memory associated with the vehicle manufacturer 150. The electronic certificate(s) received by the dealership 160 may be stored on memory associated with the dealership and may be accessible by the one or more computers associated with the dealership. The electronic certificates with which the IVI system 110 is provisioned may be stored on the memory 114 and the electronic certificates with which the electronic device is provisioned 120 may be stored on the electronic device memory 124.

The electronic certificates, as referred to herein, may include any suitable electronic document or other information that may be used to verify the identity of an entity associated with the same. The electronic certificate may further be used to authenticate the entity holding the same by another party. In certain embodiments, the electronic certificates may use a digital signature to link a public key and identity to the electronic document. As a result, when another party accesses the electronic certificate, the other party can be made aware that the public key is associated with the party holding the electronic certificate. The electronic certificate may further be certified by a trusted entity, such as a certifying entity. Several pieces of information may be associated with the electronic document, including, but not limited to, a signature, an algorithm to create the signature, an identification number, an issuer, valid date ranges, certificate usage information, a security hash, a security hash algorithm, or combinations thereof. Furthermore, in some embodiments electronic certificates are composed of a series of certificates commonly referred to as a "chain," where each earlier certificate in the chain is associated with a public key that is subsequently used to sign (Using a corresponding private key) the next certificate in the chain. The first certificate in such a chain is ordinarily a self-signed "root certificate," Therefore, for the purposes of this application, the term "electronic certificate," as referred to herein, may in some embodiments be a chain of certificates rather than a single certificate. The usage of electronic certificates are well known and will not be delved into in detail in the interest of brevity.

Figure 4:
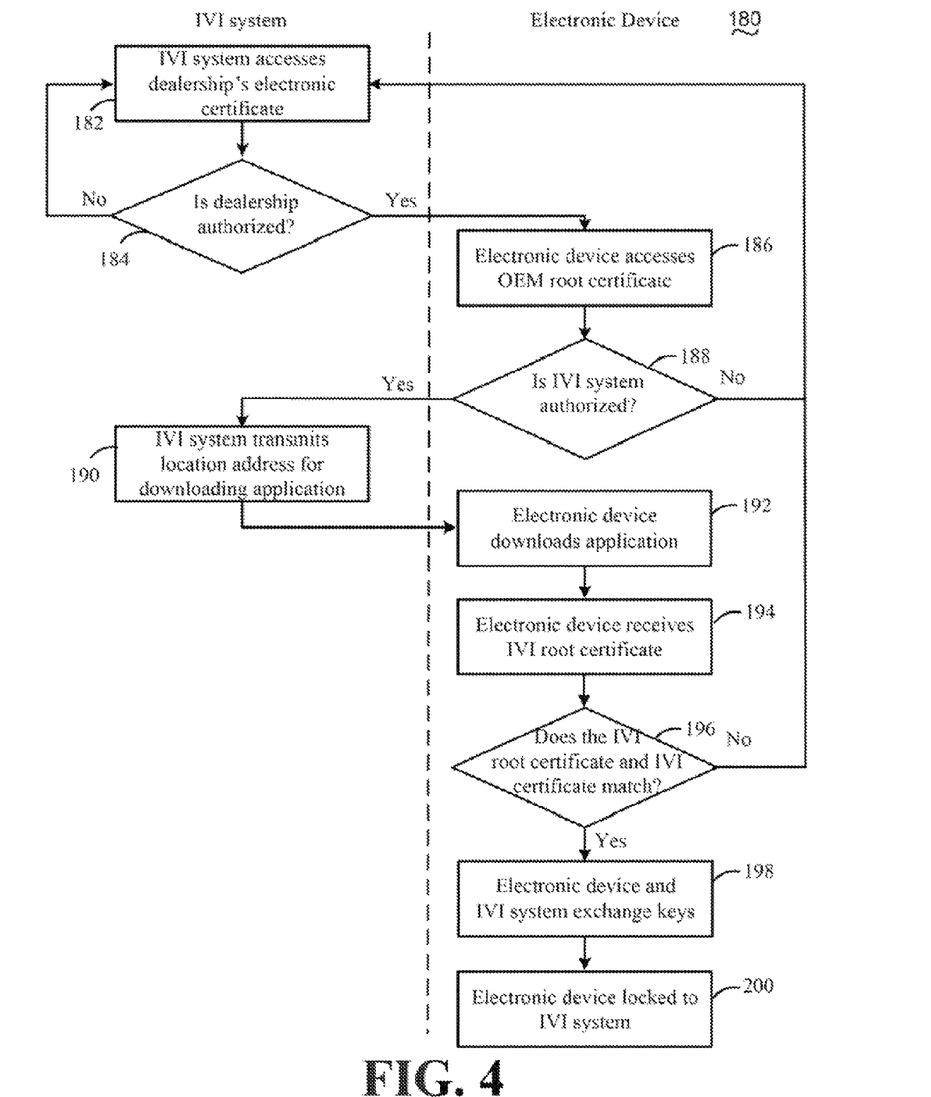
FIG. 4 is a simplified flow diagram illustrating an example method for pairing and locking the electronic device and the vehicle of FIG. 1 in accordance with embodiments of the disclosure.

Referring now to FIGS. 3 and 4, an example method 180 of securing the system 110 to the electronic device is illustrated. At block 182, the IVI system may access the dealership's electronic certificate. As described above, the accessed electronic certificate may be the dealer certificate as provided to the dealership 160 from the vehicle manufacturer 150. The IVI system 110 and the one or more processors 112, in particular, may access the dealer certificate held by the dealership 160 electronically via communicative link 164. The communicative link 164 may be either a hardwired link or any variety of wireless links, as described above with reference to communicative links associated with the vehicle manufacturer 150.

At block 184, the IVI system may determine if the dealership is authorized. The determination may be made by comparing the dealer certificate as accessed at block 182 to the OEM root certificate for dealers as stored in the memory 114. The comparison may be conducted by the one or more processors 112 by accessing the memory 114 and comparing one or more elements of information associated with the OEM certificate for dealers with the dealer certificate. In one aspect, the signature on both certificates may be compared. Based on the comparison, the IVI system may determine if the dealership 160 is authorized to perform the secure pairing of the IVI system 110 with the electronic device 120. In certain embodiments, if there is a match between one or more of the pieces of information compared by the one or more processors 112 from the dealer certificate and the OEM certificate for the dealer, then the one or more processors 112 may determine that the dealership is authorized.

If at block 184, the IVI system 110 determines that the dealership 160 is not authorized based on the comparison between the dealer certificate and the OEM certificate for the dealer, then the method may return to block 182 to access the dealership's electronic certificate. In other words, if the one or more processors 112 determine that the dealership is not authorized to perform the secure pairing, then the IVI system 110 may not proceed with any further actions related to the secure pairing process and, instead, wait to receive a new dealership electronic certificate.

Optionally, the IVI system 110 may identify a secure pairing attempt by an unauthorized entity as a fraudulent attempt. The system 110 may notify the owner or user of the vehicle 102 if a fraudulent attempt is detected. Such a notification may be made via the one or more processors 112 of the IVI system providing a sensory output to one or more sensory elements 106 of the vehicle 102 or sending a message, such as a text message, to the user via a variety of channels, such as a cellular telephone. The IVI system 110 may further notify the vehicle manufacturer 150, an authorized dealership, or a law enforcement agency if a fraudulent attempt is detected. This type of notification may be through a variety of mechanisms, including, but not limited to HTTP POST to a web server, email, text messaging, SMS messaging, or the like.

If at block 184, it is determined that the dealership is authorized, then at block 186, then the electronic device may access the OEM electronic device root certificate. The accessing process may be initiated by the dealership 160 or by the IVI system 110. In one aspect, the access of the OEM electronic device root certificate may be accessed by an application running on the one or more electronic device processors 122 of the electronic device 120.

It should be noted that optionally, the IVI system 110 may determine if the electronic device is authorized before the method 180 proceeds to block 186. The determination may be made by accessing the electronic device certificate from the electronic device 120 via the communicative link 170 and comparing the same to the OEM electronic device root certificate as stored in the memory 114. The comparison may be conducted by the one or more processors 112 by accessing the memory 114 and comparing one or more elements of information associated with the OEM electronic device root certificate with the electronic device certificate. In one aspect, the signature on both certificates may be compared. Based on the comparison, the IVI system may determine if the electronic device 120 is authorized to be paired to the IVI system 110.

At block 188, the electronic device may determine if the IVI system is authorized. The determination may be made by comparing the OEM electronic device root certificate as accessed at block 186 to the OEM electronic device root certificate as stored in the electronic device memory 124. The comparison may be conducted by the one or more electronic device processors 122 by accessing the electronic device memory 121 and comparing one or more information elements associated with the OEM electronic device root certificate with the OEM electronic device root certificate stored in the electronic device memory 124. In one aspect, the signature on both certificates may be compared. Based on the comparison, the electronic device 120 may determine if the IVI system 110 is authorized to engage in the secure pairing of the IVI system 110 with the electronic device 120. In certain embodiments, if there is a match between one or more of the pieces of information compared by the one or more electronic device processors 122 from the two compared electronic certificates match, then the one or more electronic device processors 112 may determine that the IVI system 110 authorized.

If at block 188, the electronic device 120 determines that the IVI system 110 is not authorized based on the comparison between the OEM electronic device root certificate held by the IVI system 110 and the electronic device 120, then the method may return to block 182 to access the dealership's electronic certificate. However, if at block 188, it is determined by the electronic device 110 that the IVI system 120 is authorized, then at block 190, the IVI system may transmit an electronic location address for downloading an application to the electronic device. In one aspect, the electronic location address may be a universal resource locator (URL) that can be accessed by the electronic device 120 via, the internet 174. Upon receiving the electronic location address from the IVI system 110, the electronic device, at block 192 may access the electronic location address and download the application software at that location. The electronic device 120 may use, for example, the internet to access the node or location corresponding to the electronic location address. In certain alternate embodiments, the electronic device 120 may receive the application directly from the IVI system 110 or the dealership 160.

The downloaded application may contain an additional electronic certificate, such as an IVI root certificate. At block 194, the electronic device receives the IVI root certificate from the downloaded application. The electronic device 120 may extract or isolate the IVI root certificate from the downloaded application. Once the IVI root certificate is extracted, the one or more electronic device processors 122 may determine if the IVI root certificate and the IVI system certificate match. If there is no match between the two, then the method 180 may return to block 182. However, if there is a match, then the electronic device and the IVI system may exchange authentication information, such as security keys at block 198.

Once the security keys are exchanged, the electronic device and the IVI system may be securely paired at block 200. In one aspect, the security keys may include cryptographic keys, such as a password authenticated key agreement. In certain embodiments, the authentication information exchanged by the IVI system 110 and the electronic device 120 may be part of a public key infrastructure. In one aspect, the one or more processors 112 of the IVI system 110 may send a first public key associated with a first private key to the electronic device 120 and the one or more electronic device processors 122 of the electronic device 120 may, in turn, send a second public key associated with a second private key to the at least one processor 112. As a result, the IVI system 110 and the electronic device 120 may be securely paired as each may utilize the public key of the other to access the other. As a result, a wide variety of infotainment can be shared between the IVI system 110 and the electronic device 120 securely.

In certain embodiments, the authentication information may be stored on a trusted platform module (TPM) associated with either the IVI system 110 or the electronic device 120. In certain embodiments, the TPM may be implemented in hardware as part of either the one or more processors 112 or the one or more electronic device processors 122. In other embodiments, the TPM may be a separate processor that is communicatively coupled to either the one more processors 112 or the one or more electronic device processors 122. The TPM, in on aspect, may be used to store authentication information, verify signatures and authority of authentication information, and establish trust between the IVI system 110 and the electronic device 120.

It should be noted, method 180 may be modified in various ways in accordance with certain embodiments of the disclosure. For example, one or more operations of method 180 may be eliminated or executed out of order in other embodiments of the disclosure. Additionally, other operations may be added to method 180 in accordance with other embodiments of the disclosure.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising:
   accessing, by at least one processor associated with a vehicle, a first electronic certificate associated with a first party;
   determining, by the at least one processor, that the first party is authorized based on an evaluation of the first electronic certificate;
   transmitting, based at least in part on determining that the first party is authorized, a second electronic certificate to a portable electronic device, the second electronic certificate to enable the portable electronic device to authenticate the at least one processors;
   transmitting, by the at least one processor, a location identifier to a portable electronic device based in part on determining that the first party is authorized, wherein a third electronic certificate is accessible using the location identifier; and
   exchanging, by the at least one processor, authentication information with the portable electronic device,
   wherein the portable electronic device is associated with the at least one processor after exchanging the authentication information.

2. The method of claim 1, wherein the first party comprises a vehicle dealership.

3. The method of claim 1, wherein the electronic certificate is provided to the first party from a second party.

4. The method of claim 3, wherein the second party comprises a vehicle manufacturer.

5. The method of claim 3, further comprising receiving, by the at least one processor, a fourth electronic certificate from the second party.

6. The method of claim 5, wherein determining if the first party is authorized comprises comparing the first electronic certificate to the fourth electronic certificate.

7. The method of claim 1, wherein the location identifier comprises a universal resource locator (URL) from which the third electronic certificate can be downloaded.

8. The method of claim 1, further comprising the portable electronic device downloading an application based at least in part on the location identifier.

9. The method of claim 1, further comprising the portable electronic device comparing the third electronic certificate to a fourth electronic certificate to authenticate the at least one processor.

10. The method of claim 9, further comprising receiving, from the portable electronic device, an indication of the portable electronic device authenticating the at least one processor.

11. The method of claim 9, wherein exchanging the authentication information with the portable electronic device is based at least in part on the comparing the third electronic certificate to the fourth electronic certificate.

12. The method of claim 1, wherein associating the portable electronic device with the at least one processor comprises electronically securing the portable electronic device to the at least one processor.

13. The method of claim 1, wherein the authentication information is stored in a trusted platform module of at least one of the processors or the portable electronic device.

14. The method of claim 1, wherein exchanging authentication information comprises the at least one processor sending a first public key associated with a first private key to the portable electronic device and the portable electronic device sending a second public key associated with a second private key to the at least one processor.

15. A vehicle comprising:
an in-vehicle infotainment (IVI) system comprising at least one processor and configured to store a first electronic certificate; and,
an electronic device comprising at least one electronic device processor and configured to be communicatively coupled to the IVI system and access the first electronic certificate, wherein the electronic device accesses the first electronic certificate based on part on authorizing a first party that initiates pairing the electronic device to the IVI system,
wherein, the at least one electronic device processor is configured to compare the first electronic certificate with a second electronic certificate to authenticate the IVI system and based in part on the comparison exchange authentication information with the at least one processor, and
wherein, the electronic device and the IVI system are associated with each other based at least in part on the exchange of the authentication information.

16. The vehicle of claim 15, wherein the first party comprises a vehicle dealership.

17. The vehicle of claim 15, wherein the first electronic certificate is stored on an electronic memory associated with the IVI system.

18. The vehicle of claim 15, wherein exchanging authentication information comprises the at least one processor sending a first public key associated with a first private key to the at least one electronic device processor and the at least one electronic device processor sending a second public key associated with a second private key to the at least one processor.

19. A portable electronic device comprising:
at least one electronic device memory that stores computer-executable instructions; and
at least one electronic device processor communicatively coupled to the at least one electronic device memory and configured to:
access an IVI electronic certificate from an in-vehicle infotainment (IVI) system associated with a vehicle;
receive a location identifier from the IVI system;
receive an IVI root electronic certificate using the location identifier, wherein receiving the IVI root electronic certificate indicates that the IVI system has authenticated an entity that initiates pairing the IVI system to the portable electronic device;
compare the IVI electronic certificate to the IVI root electronic certificate; and,
based on the comparison, exchange authentication information with the IVI system.

20. The portable electronic device of claim 19, further comprising an electronic device memory communicatively coupled to the at least one processor and configured to store at least one of the IVI electronic certificate or the IVI root electronic certificate.

21. The portable electronic device of claim 19, wherein the location identifier comprises a universal resource locator (URL).

22. The portable electronic device of claim 19, wherein exchanging authentication information comprises the at least one processor sending a first public key associated with a first private key to the at least one electronic device processor and the at least one electronic device processor sending a second public key associated with a second private key to the at least one processor.

23. At least one non-transitory computer readable medium comprising computer-executable instructions that, when executed by one or more processors associated with a vehicle, executes operations comprising:
receiving an first electronic certificate from a first party;
determining, based at least in part on the electronic certificate, that the first party is authorized;
transmitting a second electronic certificate to a portable electronic device, the second electronic certificate to enable the portable electronic device to authenticate the one or more processors;
transmitting an address to a portable electronic device based in part on determining if the first party is authorized, wherein a third electronic certificate is accessible using the address; and,
exchanging authentication information with the portable electronic device,
wherein the portable electronic device is associated with the at least one processor after exchanging the authentication information.

24. The at least one non-transitory computer readable medium of claim 23, wherein the operations further comprise receiving, by the at least one processor, the third electronic certificate from a website corresponding to the address.

25. The at least one non-transitory computer readable medium of claim 24, wherein determining if the first party is authorized comprises comparing the first electronic certificate to the third electronic certificate.

26. The at least one non-transitory computer readable medium of claim 23, wherein the operations further comprise the portable electronic device comparing the third electronic certificate to a fourth electronic certificate to authenticate the one or more processors.

27. The at least one non-transitory computer readable medium of claim 26, wherein the operations further comprise receiving an indication that the portable electronic device has authenticated the one or more processors.

* * * * *